(12) United States Patent
Krithivas

(10) Patent No.: US 8,631,150 B2
(45) Date of Patent: Jan. 14, 2014

(54) METHOD AND APPARATUS FOR IN-BAND MANAGEMENT OF STORAGE DEVICES

(75) Inventor: Ramamurthy Krithivas, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1729 days.

(21) Appl. No.: 11/473,173

(22) Filed: Jun. 21, 2006

(65) Prior Publication Data

US 2007/0299951 A1 Dec. 27, 2007

(51) Int. Cl.
*G06F 15/16* (2006.01)

(52) U.S. Cl.
USPC ........... 709/236; 709/220; 709/224; 709/228; 709/230; 709/245

(58) Field of Classification Search
None
See application file for complete search history.

(56) References Cited

U.S. PATENT DOCUMENTS

| | | | | |
|---|---|---|---|---|
| 6,304,942 | B1 * | 10/2001 | DeKoning | 711/114 |
| 6,647,387 | B1 * | 11/2003 | McKean et al. | 709/229 |
| 7,403,987 | B1 * | 7/2008 | Marinelli et al. | 709/223 |
| 2005/0108725 | A1 * | 5/2005 | Hudis et al. | 719/316 |
| 2005/0138040 | A1 * | 6/2005 | Lamb et al. | 707/100 |
| 2006/0271773 | A1 * | 11/2006 | Marquiz | 713/1 |
| 2007/0234355 | A1 * | 10/2007 | Locker et al. | 718/1 |

OTHER PUBLICATIONS

Eddy, Sandra E., "XML in Plain English", Published by M&T Books in 1998, pp. 6-7.*
"SNIA Storage Management Initiative CIM/WBEM Technology Backgrounder", *SNIA Storage Management Initiative CIM/WBEM Technology Backgrounder*; copyright 2002 *Storage Networking Industry Association*, 2 pages.
"The Storage Management Initiative", *The Storage Management Initiative;SNIA*, copyright 2004 *Storage Networking Industry Association*, 4 pages.
Redigolo, et al., "Analyzing Emerging Web Based Management Standards", Redigolo et al.: *Analyzing Emerging Web Based Management Standards; Technical Report on Network and Distributed Systems*, Bolume 1, Jul.-Aug. 1999; *Laboratorio de Arquitetura e Redesde Computadores*, 8 pages.
Weber, "Information Technology—SCSI Primary commands—2 (SPC-2)", *Information Technology—SCSI Primary commands—2 (SPC-2)*, Weber (editor): dpANS Project T10/1236-D, Revision 20, Jul. 18, 2001, Reference Number: ISO?IEC 14776-312 : 200X.

* cited by examiner

*Primary Examiner* — Patrice Winder
*Assistant Examiner* — Nam Tran
(74) *Attorney, Agent, or Firm* — Christopher K. Gagne

(57) ABSTRACT

A management request from a management client to perform an operation on a storage element includes an instance identifier identifying the storage element. A translator translates the instance identifier to a storage identifier that uniquely identifies the storage element. The method identifying the operation and the storage identifier is encapsulated in a storage command and forwarded to the storage element.

24 Claims, 6 Drawing Sheets

METHOD AND APPARATUS FOR IN-BAND MANAGEMENT OF STORAGE DEVICES

FIELD

This disclosure relates to management of storage devices and in particular to in-band management of storage devices.

BACKGROUND

A storage area network (SAN) is a high-speed network that interconnects different types of storage elements with servers and provides a shared storage pool for servers (hosts) connected to the SAN. The storage elements may include storage arrays, switches, expanders, volume managers, Host Bus Adapters (HBAs) and Redundant Arrays of Independent Disks (RAID).

A Redundant Array of Independent Disks (RAID) combines a plurality of physical hard disk drives into a logical drive for purposes of reliability, capacity, or performance. Thus, instead of multiple physical hard disk drives, an operating system sees the logical drive.

The Storage Management Initiative-Specification (SMI-S) is a storage standard developed and maintained by the Storage Networking Industry Association (SNIA) and ratified as American National Standards Institute (ANSI) standard ANSI INCITS 388-2004. SMI-S is an object orientated, platform independent standard for managing storage elements in a SAN based upon a Common Information Model (CIM) and Web-Based Enterprise Management (WBEM) standards (using Extensible Markup Language (XML) over Hyper Text Transfer Protocol (HTTP)) defined by the Distributed Management Task Force (DTMF). SMI-S also provides security and automated discovery of storage elements coupled to a SAN. SMI-S allows storage elements to be managed through out-of-band connections.

Although a standard mechanism has been defined through the use of the Small Computer Systems Interface (SCSI)-3 Controller Commands (SCC) for in-band management of storage arrays using the SCSI addressing architecture, it has not been adopted, primarily due to security related concerns. Instead, management of a storage array is typically performed out-of-band over a local area network separate from the SAN.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

In an embodiment of the present invention, the Small Computer Systems Interface (SCSI) Addressing architecture is applied to Storage Management Initiative-Specification (SMI-S) allowing in-band management of storage arrays or a Redundant Array of Independent Disks (RAID) through SMI-S. Furthermore, the same SCSI addressing architecture may be used for both in-band and out-of-band management of storage arrays.

Figure 1:
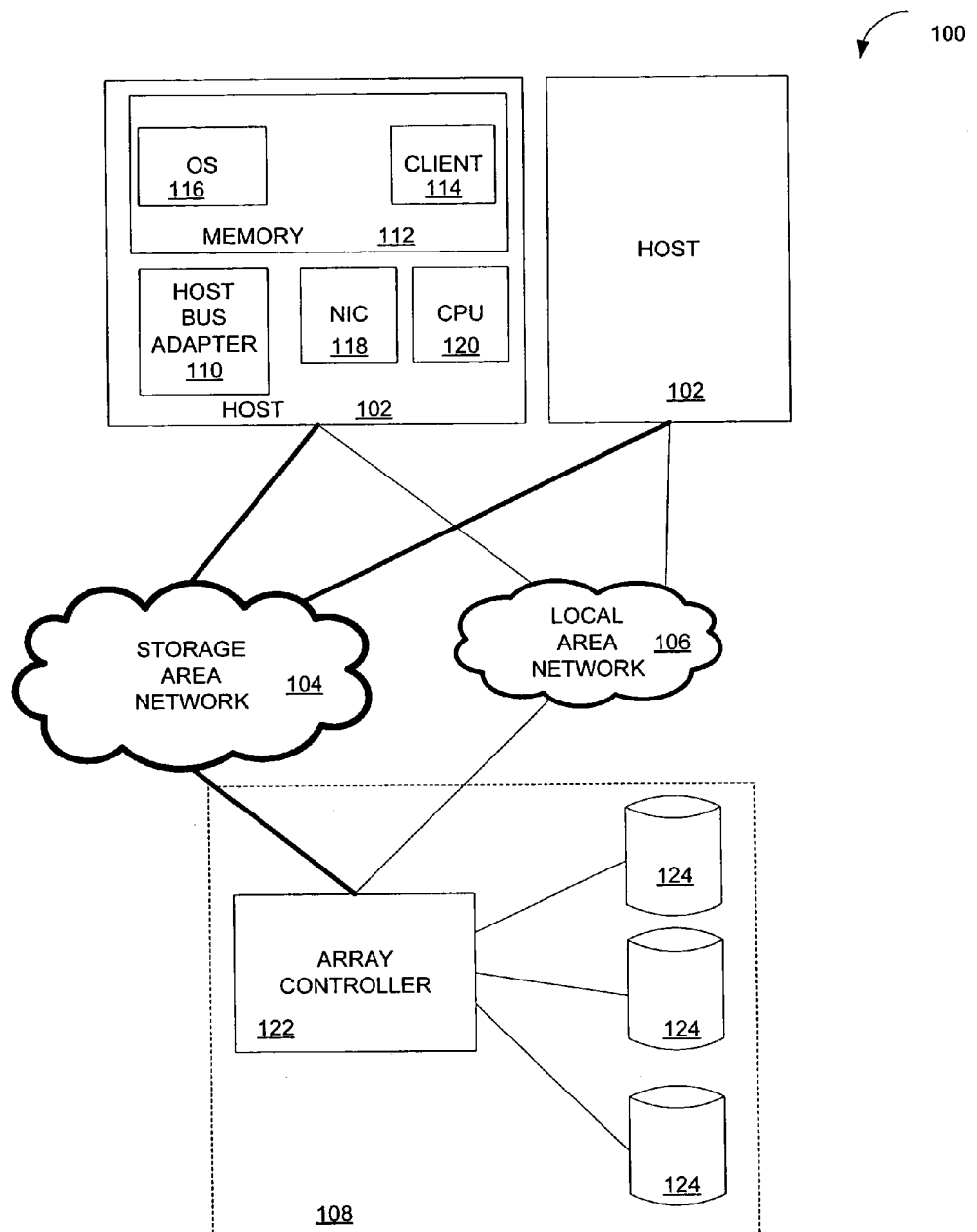
FIG. 1 is a block diagram of a system that includes a host and a redundant array of independent disks coupled to a storage area network.

FIG. 1 is a block diagram of a system 100 that includes a host 102 and a redundant array of independent disks (RAID) array 108 coupled to a storage area network (SAN) 104. The host 102 includes a host bus adapter (HBA) 110, a Central Processing Unit (CPU) 120, a network interface controller (NIC) 118, and memory 112 capable of storing a client 114 and an operating system (OS) 116. The OS 116 manages a file system that manages files which may be stored in the RAID array 108. The client 114 is a process that issues requests for service through the HBA 110 to the RAID array 108. The HBA 110 manages communication between the host 102 and devices such as the RAID array 108 through the SAN 104.

The system shown in FIG. 1 includes two hosts 102, and each host 102 may access the RAID array 108 through the SAN, that is, in-band. Each of the hosts 102 may also access the RAID array 108 through a local area network (LAN) 106, that is, out-of-band. In-band and out-of band accesses differ in that in-band accesses are directed through the HBA 110 in the host 102 and out-of-band access are directed through the NIC 118 in the host 102 over the LAN 106. Out-of-band access is generally used to manage the RAID array 108.

The RAID array 108 includes an array controller 122 and a plurality of hard disk drives 124. The array controller 122 manages the plurality of hard disk drives 124 which may be aggregated into a single logical storage unit. The array controller 122 distributes data across the set of hard disk drives based on one of a plurality of RAID levels. As is well known to those skilled in the art, there are many standard methods for distributing data across a logical storage unit. These methods are referred to as RAID levels.

For example, in RAID level 0 data is striped across the physical array of hard disk drives by breaking data into blocks and writing each block to a separate drive. Input/Output (I/O) performance is improved by spreading the load across many hard disk drives. However, RAID level 0 does not provide redundancy, that is, if one disk fails all data is lost. Thus, RAID level 0 improves I/O performance but does not provide redundancy.

RAID level 5 provides a high level of redundancy by striping both data and parity information across at least three hard disk drives. Data striping is combined with distributed parity to provide a recovery path in case of failure.

The SAN 104 is a high-speed network that is dedicated to providing a high-speed connection between hosts 102 and storage elements. The hosts 102 and storage elements communicate over the SAN 104 using one of a plurality of Small Computer System Interface (SCSI) protocol suites, for example, Internet Small Computer Systems Interface (iSCSI), Serial Attached Small Computer System Interface (SAS) and Fibre Channel (FC).

A version of the Fibre Channel standard is described in the American National Standards Institute (ANSI) Standard Fibre Channel Framing and Signaling Interface-2 (FC-FS-2) Aug. 9, 2005 Specification. A version of the Fibre Channel Protocol (FCP-3) standard which defines a mapping protocol for applying the Small Computer System Interface (SCSI) command set to Fibre Channel is described in Information technology-Fibre Channel Protocol for SCSI, Third Version (FCP-3) Revision 4, Sep. 13, 2005 American National Standards Institute (ANSI) (hereinafter termed the "FCP standard"). A version of the SAS protocol is described in "Information Technology—Serial Attached SCSI—11.1," Working Draft American National Standard of International Committee For Information Technology Standards (INCITS) T10 Technical Committee, Project T10/1562-D, Revision 1, published Sep. 18, 2003, by ANSI (hereinafter termed the "SAS Standard").

T10 is an American National Standards Institute (ANSI) body responsible for developing SCSI Standards that include SCSI Architecture Model (SAM), SCSI Primary Commands (SPC), SCSI Block Commands (SBC), Serial Attached SCSI (SAS), SES (SCSI Enclosure Standard), and SCC (SCSI Controller Commands). SCC Enables RAID Management and SEC Enables Enclosure Management for Storage Arrays. SCSI Addressing methods are described in the ANSI SCSI Architecture Model (SAM) standard.

The serial attached storage protocols provide a connection-orientated class of service between devices. Typically, in a serial attached storage protocol, a connection is established between an initiator (originator) and a target (responder). The initiator may be a storage protocol controller such as a Host Bus Adapter (HBA) and the target may be a storage device, for example, a hard disk drive, Digital Video Disk (DVD) drive, compact disk (CD) drive, Redundant Array of Independent Disks (RAID), or tape drive.

After the connection is established between the initiator and the target, commands, data and status information encapsulated in frames are exchanged between the initiator and the target. Frames may be received in the same order that they are transmitted. A frame is a package of information transmitted as a single unit. The format of the frame and encapsulated information is defined by the protocol suite.

A SCSI storage element also referred to as a SCSI logical unit includes a logical unit number (LUN) which is a world wide unique identifier. The logical unit number which is stored in non-volatile memory in the SCSI logical unit is used to persistently identify the SCSI logical unit. Typically, 64-bits (8 bytes) are allocated for storing the logical unit number. Although 64-bits are allocated, all of the bits may not be used for all storage protocols. The logical unit number may be accessed from the SCSI logical unit during the discovery process through the use of a SCSI INQUIRY command which is a SCSI primary command and is defined in the ANSI T10 SCSI standards.

The RAID array 108 has front end ports connected to hosts 102 through the SAN 104 and backend ports connected to hard disk drives 124 managed by an array controller 122.

The client 114 uses the SMI-S standard to manage storage elements such as the RAID array 108 in the SAN 104 using one or more objects defined by the SMI-S standard for the storage element. The SMI-S model is divided into several profiles. A profile describes a class of SAN entities, for example, a switch or a disk array. For example, SMI-S defines an array profile instance to describe an external RAID array. The array profile instance will be described later in conjunction with FIG. 2.

SMI-S defines an object oriented message based interface for controlling elements in a storage area network. SMI-S capabilities are defined by a hierarchy of object classes with properties and methods. The object oriented interface allows a client to discover, monitor, and control storage devices irrespective of the implementation of the storage devices.

The SMI-S object model is based on the Common Information Model (CIM). Web Based Enterprise Management (WBEM) also referred to as CIM/Extensible Markup Language (XML) over Hyper Text Transfer Protocol (HTTP) implements the messaging based interface. WBEM Clients are management clients that communicate with a Common Information Model Object Manager (CIMOM) using the CIM/XML/HTTP protocol suite.

Figure 2:
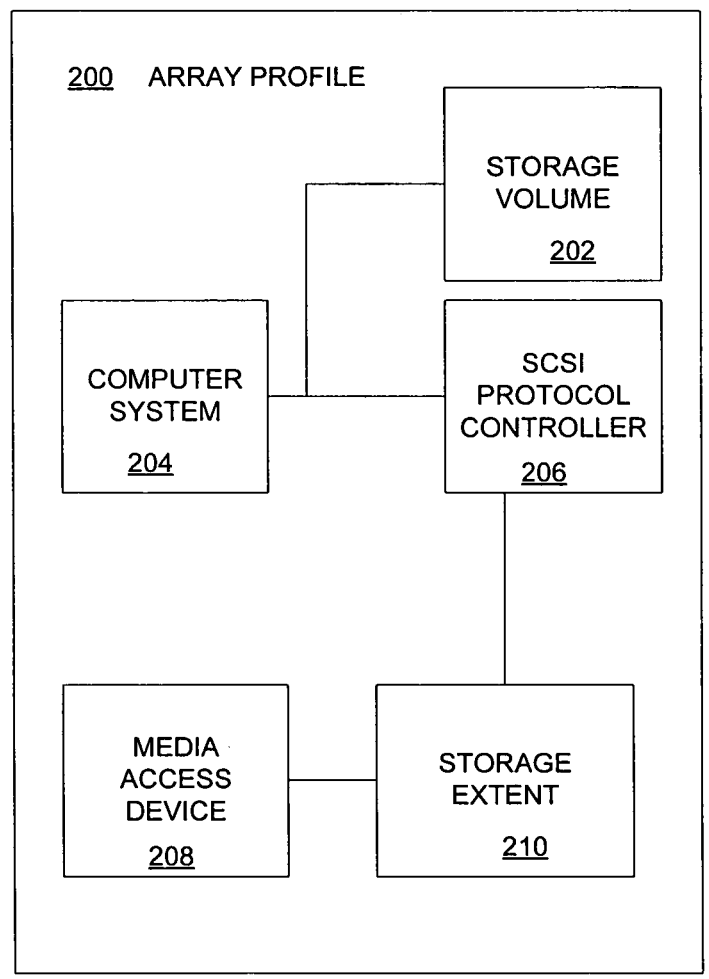
FIG. 2 is an embodiment of an array profile instance diagram defined by SMI-S to describe an external RAID array.

FIG. 2 is an embodiment of an array profile instance 200 defined by SMI-S to describe an external RAID array 108. The array profile instance 200 includes objects based on the Common Information Model (CIM) which is an object oriented description of the entities and relationships in a management environment that is maintained by the Distributed Management Task Force (DTMF). CIM includes a core model which addresses high-level concepts such as systems and devices and common models. CIM also includes common models which describe specific domains such as computer system, network, user or device management and include "classes, "properties" and "methods" used for management.

Each CIM object has a corresponding CIM Class instance. Managed CIM objects are addressed through their respective instances of CIM Class and each instance has a corresponding instance identifier.

The array profile instance diagram 200 shown in FIG. 2 includes a computer system CIM object having a corresponding CIM Class instance ComputerSystem 204 that represents the RAID array 108 (FIG. 1) as a whole. A RAID volume that is equivalent to a SCSI logical unit (LUN) is represented by a StorageVolume CIM class 202. An array controller 122 (FIG. 1) is represented as a SCSIProtocolController CIM class 206, and a physical disk is addressed to an instance of MediaAccessDevice (Hard disk drive) CIM class 208 linked to a StorageExtent CIM class 210 that represents the storage in the hard disk drive.

As the external RAID array 108 (FIG. 1) may provide backup storage capacity to be used in place of a failed component, a group of spare disks in the RAID array may be represented through CIM class instance CIM_StorageRedundancySet. Thus, a RAID array may be defined as a StorageVolume CIM class 202 based on a RAID group that is based on a plurality of StorageExtent CIM class 210. The client 114 (FIG. 1) manages the elements in the RAID array 108 (FIG. 1) using instance identifiers assigned to the CIM class instances.

Figure 3:
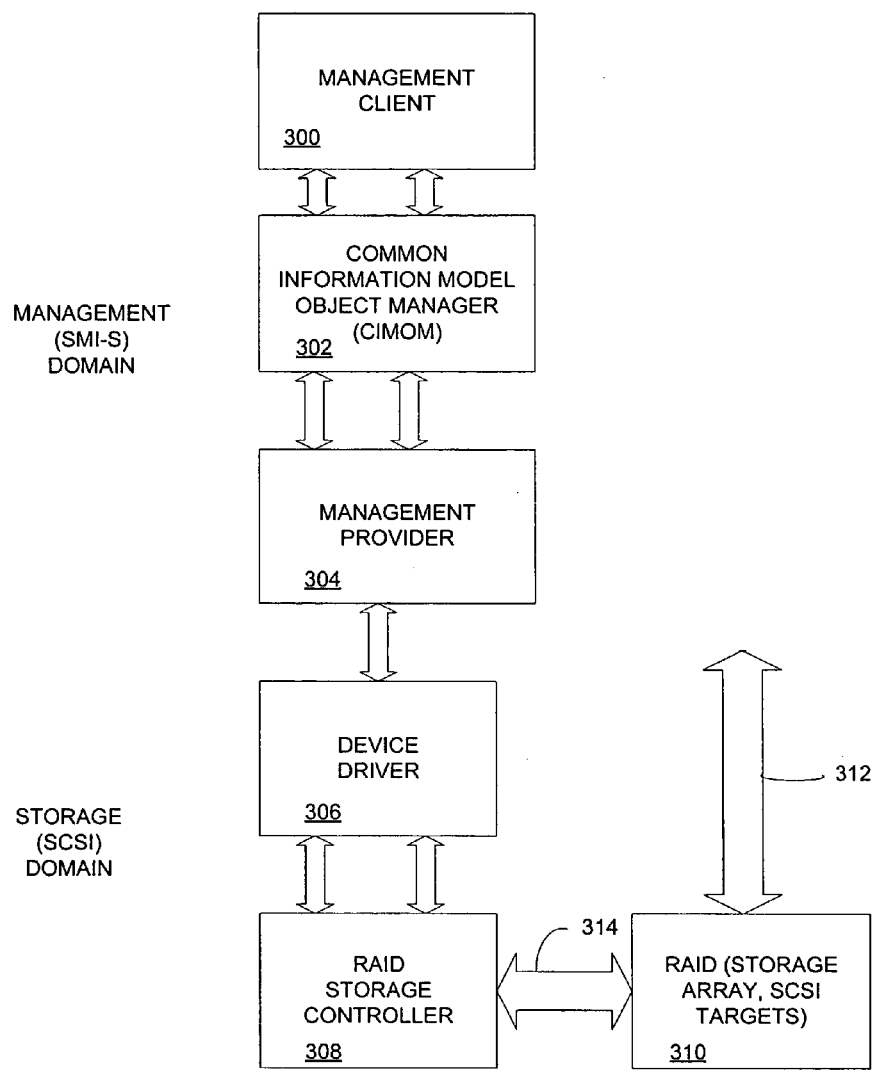
FIG. 3 is a block diagram illustrating in-band management of an external RAID array in a SCSI domain by a management client in a SMI-S management domain according to the principles of the present invention.

FIG. 3 is a block diagram illustrating in-band management of an external RAID array 108 in a Small Computer Systems Interface (SCSI) domain by a management client 300 in an SMI-S management domain according to the principles of the present invention. The management of the system 100 shown in FIG. 1 includes an SMI-S management domain and a storage domain as shown in FIG. 3. In the SMI-S domain, identifiers of CIM instances are used to identify storage elements as described in conjunction with the array profile 200 shown in FIG. 2. In the storage domain, storage identifiers are used to identify storage elements. In one embodiment, the storage identifiers are SCSI LUN identifiers defined by the SCSI standards.

In an embodiment, the SMI-S management domain includes a management client 300, a Common Information Model Object Manager (CIMOM) 302 and a management provider 304 in the host 102 of FIG. 1. The storage domain includes a device driver 306, a RAID Storage Controller 308 and RAID targets 310 in the RAID array 108 of FIG. 1.

The management provider 304 communicates with the storage target 310 through the HBA 110 (FIG. 1), and the device driver 306.

In another embodiment, the CIMOM 302 and management provider 304 may be in the RAID array 108 of FIG. 1.

The storage domain includes a device driver 306 which is a device specific control program that enables operation with a particular device. In one embodiment, the device driver 306 enables operation with the RAID storage controller 308. The storage controller 308 manages an array of hard disk drives in the RAID 310 using one of a plurality of serial storage protocols, for example, Serial Attached Small Computer System Interface (SAS) or Fibre Channel (FC).

A management client 300 is a process that runs in any one of the hosts 102 shown in FIG. 1. In an embodiment, the management client 300 may enable an administrator to configure and control the managed elements in the storage domain. The management client 300 issues management requests to perform operations on the managed elements. The management requests identify the storage elements using their assigned SMI-S/CIM instance identifiers and identify the operations to be performed using SMI-S defined methods. For example, the management client 300 may be client 114 in host 102 shown in FIG. 1.

In an embodiment, the management client 300 may be a Web-Based Enterprise Management (WBEM) client that communicates with a Common Information Model Object Manager (CIMOM) 302 using the CIM/XML/HTTP protocol suite through a messaging interface. Through the messaging interface, the management client 300 issues management requests to the CIMOM 302.

The managed elements include a RAID array 310 which may be represented as a Common Information Model (CIM) object (array profile 200 (FIG. 2)). The management client 300 communicates with the CIMOM 302 which manages CIM objects. The CIMOM 302 transfers information to a managed element through the management provider 304. The management provider 304 includes software drivers that interface managed elements with CIMOM 302, and enable their control using the management client 300.

In an embodiment, the CIMOM 302 is in the host 102 shown in FIG. 1. In response to a message received from the management client 300, the CIMOM 302 generates an SMI-S method for a CIM instance address associated with the managed element which is forwarded to the management provider 304.

In the embodiment shown, the management provider 304 is also in the host 102 (FIG. 1) and also operates in the SMI-S management domain. The management provider 304 is shared by all device drivers 306 in the storage domain and translates a CIM instance address associated with a managed element to a SCSI address corresponding to the managed storage element. Instead of using a proprietary method in the device driver 306 to manage a storage element having an associated CIM instance address, a CIM instance address is translated to a SCSI address by the management provider 304 in the SMI-S domain. The SCSI address is used in all commands and command responses between the device driver 306 in the storage domain and the management provider 304 in the SMI-S domain.

In the embodiment shown, each storage element in the RAID (storage array) 310 has a respective logical unit number. The logical unit number may be used to uniquely identify each storage element in the RAID array 310.

The management provider 304 stores instance identifiers assigned to CIM instances for storage elements that are managed by the management client 300 and an array of instance names associated with the CIM instances. The management provider 304 also stores information for each storage element used by the device driver 306 to address the managed elements in an array of storage identifiers. This information includes a SCSI logical unit number identifier associated with each managed element that uniquely identifies the storage element.

The management provider 304 uses the information stored in the array of CIM instance identifiers and the array of storage identifiers to translate a CIM instance identifier to the corresponding SCSI logical unit number identifier associated with the managed storage element. The SMI-S method received with the CIM instance identifier is forwarded with a SCSI logical unit number identifier to the device driver 306 in the SCSI domain.

Thus, the unique SCSI address (logical unit number) associated with the CIM instance is forwarded with SMI-S Methods to perform RAID operations in the RAID 310. The SMI-S methods forwarded to the RAID 310 include CreateOrModifyStoragePool( ), DeleteStoragePool( ), StorageElementCreation( ), GetProperty( ), and SetProperty( ) which are defined in the SMI-S standard. The management provider 304 may perform the translation of CIM instance identifier to a SCSI 8 byte (64-bit) address for all the RAID volumes, spares, storage extents and redundancy sets.

The RAID storage controller 308 receives a management request for a storage element in the RAID 310 that includes a unique SCSI address associated with the storage element and a SMI-S method. The SCSI address and the SMI-S method received by the RAID storage controller 308 is transported in-line to the SCSI target device in the RAID 310 using various SCSI command sets, such as, SCSI Primary Commands, SCSI Block commands and SCSI controller commands defined by the ANSI T10 SCSI standard. The in-line transportation is from the management provider 304 through the device driver 306 and the RAID storage controller 308 over path 314 which may use a serial storage protocol such as Fibre channel or SAS to the SCSI target device in the RAID array 310.

For example, a DeleteInstance SMI-S method may be transported in-line over path 314 by encapsulating the method in the payload of a SCSI packet using a SCSI address as shown below in Table 1. The unique SCSI address received from the management provider 304 is shown as "_Address" and is stored as the KEYBINDING NAME in the "DeleteInstance" SMI-S method. In one embodiment the SCSI packet includes a SCSI SEND command which is defined in the ANSI T10 SCSI standard. The management request (DeleteInstance SMI-S method) included in the SCSI packet may be encoded using Extensible Markup Language (XML).

TABLE 1

SCSI Command [......................]
SCSI Command Payload: [
  <SIMPLEREQ>
  <IMETHODCALL NAME="DeleteInstance">
  [
    <LOCALNAMESPACEPATH>
      <NAMESPACE NAME="root"/>

TABLE 1-continued

```
       <NAMESPACE NAME="cimv2"/>
     </LOCALNAMESPACEPATH>
  ]
     <IPARAMVALUE NAME="InstanceName">
       <INSTANCENAME CLASSNAME =
"ClassName">
          <KEYBINDING NAME=" __Address">
          <KEYVALUE
VALUETYPE=__Address__Property__Type>
          Address__Property__Value
          </KEYVALUE>
          </KEYBINDING>
       </INSTANCENAME>
     </IPARAMVALUE>
     </IMETHODCALL>
     </SIMPLEREQ>
  ]
```

The SCSI Domain ensures uniqueness in addresses, whereas CIM Instance IDs are not unique across multiple system domains. Thus, the use of unique SCSI identifiers (addresses), such as logical unit number for managing RAID elements preserves the hierarchical SCSI addressing schema. Devices can be cascaded like a tree with each node being a SCSI device. Also, the use of SCSI addresses instead of CIM Instance identifiers ensures that the support available within the SCSI domain may be used. Supporting SMI-S methods ensures that the in-band mechanism for managing storage devices is the same as the out-of-band mechanism. Furthermore, SMI-S natively supports secure management through various authentication and authorization schemes.

Supporting SMI-S methods and Extensible Markup Language (XML) encodings in-band also ensures future proofing, that is, as new classes and methods are developed by the Storage Networking Industry Association (SNIA), these methods and classes may be natively supported instead of force fitting them through proprietary mechanisms. SNIA defines various Profile, Sub-profile and Packages in the SMI-S Specification that defines the management model for RAID. For example, the Block Services Package enables the creation of storage pools, Storage Volumes, Redundancy Sets and Logical Disks and their associated RAID capabilities and settings; the Disk Spare Sub-Profile defines Storage Extents that will be used as Spares for specific Storage Pools.

Intel® Active Management Technology (AMT) provides out-of-band access to remotely diagnose and repair a system after a software, operating system or hardware failure. For example, if there is an operating system failure also referred to as a "crash", a remote out-of-band connection may be established to the failed system. The failed system may be booted to a remote drive in order to repair the system. In the case of a software or hardware failure, information stored in non-volatile memory such as flash in the system is available using out-of-band access. To provide out-of-band access, AMT includes the ability to operate even when the system is powered off or the operating system is unavailable provided that the system is connected to the network and a power outlet.

The management provider 304 may be included in both a dedicated micro controller for AMT and in a host operating system domain. In-band management is provided through the management provider 304 in the host operating system as discussed in conjunction with FIG. 3. Out-of-band management is provided by including the management provider 304 in a microcontroller dedicated to AMT which is accessed through the LAN 106 (FIG. 1). With the management provider 304 included in both the host operating system and the microcontroller dedicated to AMT, the same management architecture may be used for both in-band and out-of-band management.

Figure 4:
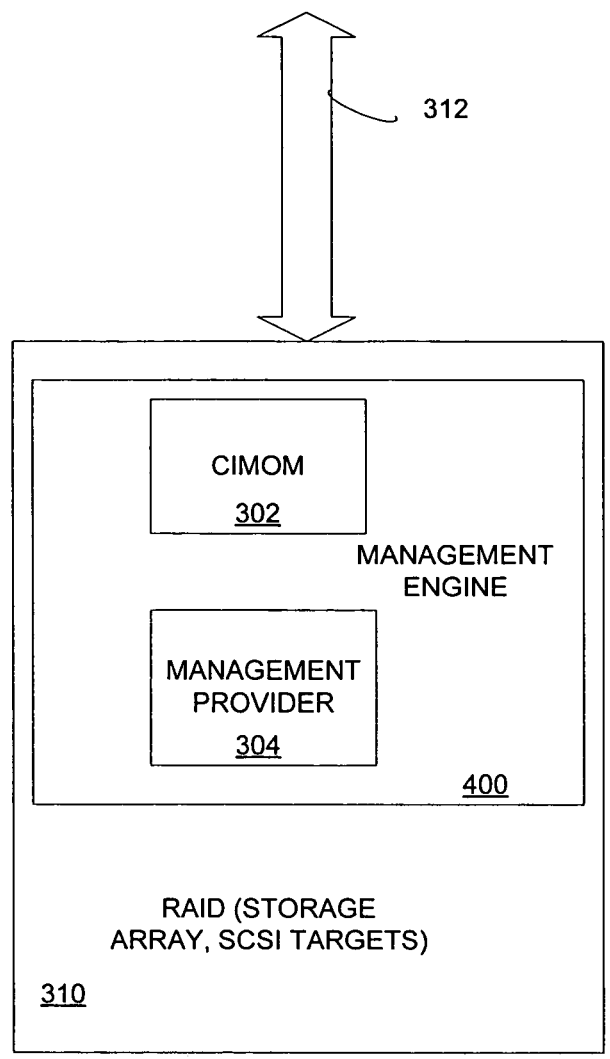
FIG. 4 is a block diagram of an embodiment of a system that includes a management provider in a management engine.

FIG. 4 is a block diagram of an embodiment of a system that includes a management provider in a management engine. The management engine 400 allows remote management of the system through the LAN 106 (FIG. 1).

The management engine 400 is included in the RAID 310 and includes the CIMOM 302 and management provider 304 discussed in conjunction with FIG. 3. The CIMOM receives management requests from the management client 300 over the local area network 106 (FIG. 1) on path 312.

Thus, the RAID array may be managed in-band through path 314 from the RAID storage controller 308 as discussed in conjunction with FIG. 3 and out-of-band through path 312 from the SMI-S domain using the same management architecture in the management provider 304 based on SCSI address.

Figure 5:
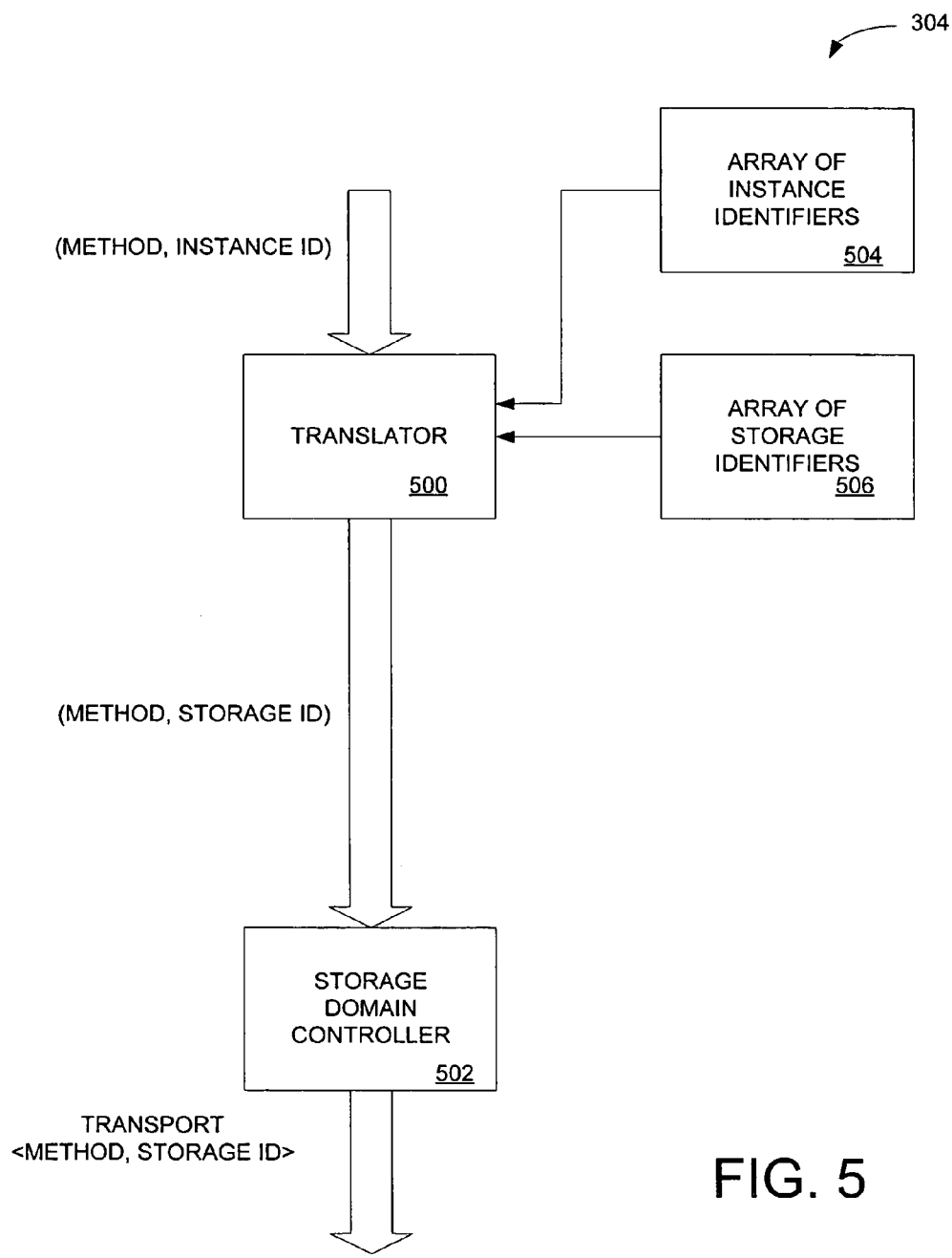
FIG. 5 is a block diagram of an embodiment of the management provider shown in FIG. 3.

FIG. 5 is a block diagram of an embodiment of the management provider 304 shown in FIG. 3. In the embodiment shown, the management provider 304 includes a translator 500, a storage domain controller 502, an array of SCSI addresses 506 and an array of instance names (identifiers) 504 assigned to storage elements in a RAID 310. The translator 500 receives management requests from the CIMOM 302. Each received management request includes a SMI-S method and a CIM instance address. The management provider 304 searches the arrays 504, 506, for a storage identifier (logical unit number) for the storage element associated with the CIM instance address. The storage identifier is forwarded with the SMI-S method to the storage domain controller 502. The storage domain controller 502 uses the storage identifier as the target for all SMI-S methods to perform RAID operations. For example, any SMI-S method that performs a RAID operation, such as methods for storage pools, creating elements and related to properties. The SMI-S method together with the storage (SCSI logical unit number) address is then transported to the device driver 306 in the storage domain encapsulated in the payload of a storage command as shown in the example in Table 1.

In an embodiment, the storage identifier is a unique SCSI address assigned to a storage element. For example, the unique SCSI address may be a 64-bit logical unit number identifier stored in non-volatile memory in the storage element that uniquely identifies the storage element.

Table 1 shows an example of a SCSI payload in Table 1 which can be used to encapsulate the SMI-S method. Completion status for the SMI-S method may be returned by encapsulating the status in a SCSI response payload through the Storage Domain controller 502 and the translator 500.

Figure 6:
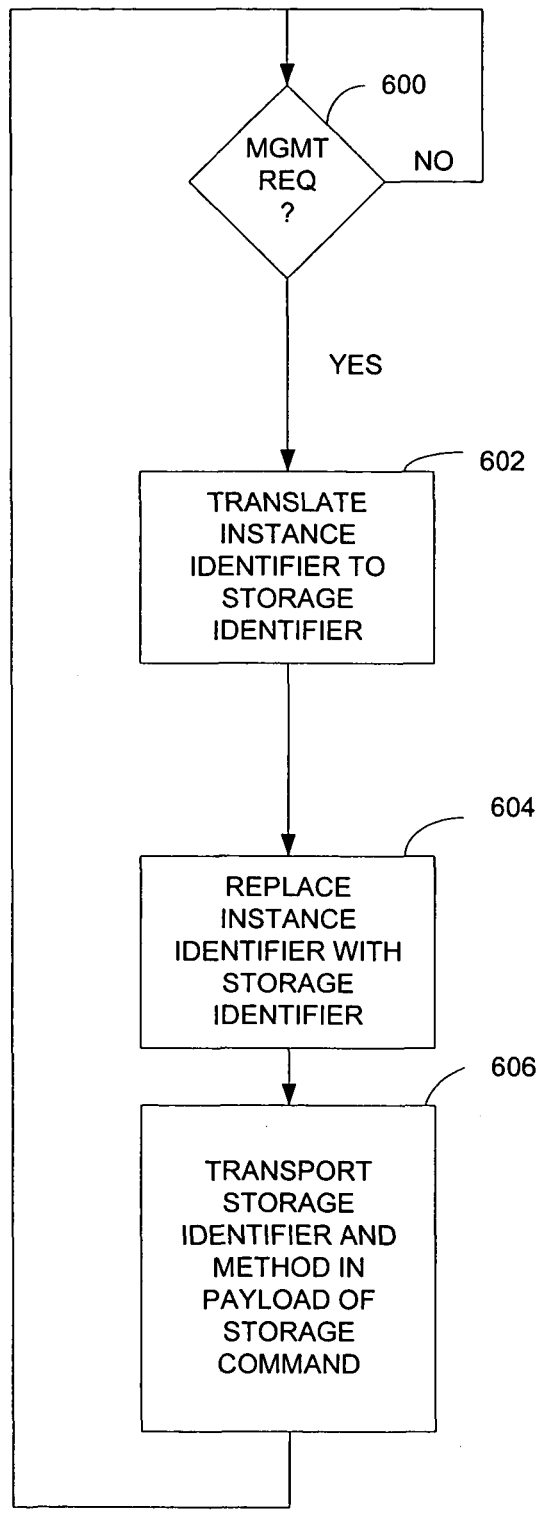
FIG. 6 is a flowchart illustrating an embodiment of a method for managing RAID according to the principles of the present invention.

FIG. 6 is a flowchart illustrating an embodiment of a method for managing a RAID system 108 according to the principles of the present invention. FIG. 6 will be described in conjunction with FIGS. 3 and 5.

At block 600, the management provider 304 waits for a management request to be received from the CIMOM 302. Upon receiving a management request, processing continues with block 602.

At block 602, the management request includes a method and an instance identifier. In an embodiment for CIM, the instance identifier is a CIM instance identifier and the method is an SMI-S method. The management provider 304 checks an array of instance identifiers 504 (FIG. 5) and an array of storage identifiers 506 (FIG. 5) to locate a storage identifier for the storage element corresponding to the CIM instance identifier. The arrays 504, 506 may be initialized during an initialization process when storage identifiers associated with storage elements accessible by the system are discovered and instance identifiers are assigned. Processing continues with block 604.

At block 604, the management provider 304 assigns the storage identifier corresponding to the instance identifier to the method. Processing continues with block 606.

At block 606, the management provider 304 generates a storage command, for example, a SCSI SEND command and encapsulates the method and the storage identifier in the storage command by storing the method with the storage identifier in the payload of the storage command. The storage command is then forwarded to a device driver 306 to the storage element through the RAID storage controller 308, over a serial storage bus (SAN 104 (FIG. 1)) to the storage element. Processing continues with block 600 to wait for another management request.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
a translator capable of translating an instance identifier associated with a storage element to a unique storage identifier associated with a storage element; and
a storage domain controller capable of encapsulating a management request in a storage request, the management request including the instance identifier and a method, the storage domain controller replacing the instance identifier with the unique storage identifier in the management request prior to forwarding the storage request to a storage array;
the translator being comprised in a management provider, the management provider being included both in a host operating system and in a microcontroller, the instance identifier being received by the translator both if the management request is for in-band management of the storage array and also if the management request is for out-of-band management of the storage array, the in-band management being provided via an in-band path that includes the host operating system, a host bus adapter, and a storage area network, the out-of-band management being provided via an out-of-band path that includes the microcontroller, a network interface controller, and a local area network, the management provider, the host bus adapter, the network interface controller, and the microcontroller being in a host, the host being to access the storage array via the in-band path for in-band management of the storage array, the host being to access the storage array via the out-of-band path for out-of-band management of the storage array, the microcontroller being capable of operating when the host operating system is unavailable and also when the host is powered-off, the in-band path and the out-of-band path being mutually distinct from each other.

2. The apparatus of claim 1, wherein the unique storage identifier is a Small Computer Systems Interface (SCSI) identifier.

3. The apparatus of claim 1, wherein the unique storage identifier is 64 bits.

4. The apparatus of claim 1, wherein the storage request is a Small Computer Systems Interface (SCSI) command from one of a plurality of SCSI command sets.

5. The apparatus of claim 4, wherein the management request is encoded using Extensible Markup Language (XML).

6. The apparatus of claim 5, wherein the management request is stored in the payload of the SCSI command.

7. The apparatus of claim 1, wherein the translator and controller are in a host operating system domain.

8. The apparatus of claim 1, wherein the translator and controller are in a micro engine dedicated to performing Active Management Technology (AMT) management.

9. The apparatus of claim 1, wherein the method is a Storage Management Initiative-Specification (SMI-S) method.

10. The apparatus of claim 1, wherein the instance identifier is a Common Information Model (CIM) instance identifier.

11. A method comprising:
receiving a management request, the management request including an instance identifier associated with a storage element and a method;
translating the instance identifier to a unique storage identifier associated with a storage element;
replacing the instance identifier with the unique storage identifier in the management request; and
encapsulating the management request in a storage request to be forwarded to a storage array;
the translating being carried out by a management provider, the management provider being included both in a host operating system and in a microcontroller, the instance identifier being translated by the management provider both if the management request is for in-band management of the storage array and also if the management request is for out-of-band management of the storage array, the in-band management being provided via an in-band path that includes the host operating system, a host bus adapter, and a storage area network, the out-of-band management being provided via an out-of-band path that includes the microcontroller, a network interface controller, and a local area network, the management provider, the host bus adapter, the network interface controller and the microcontroller being in a host, the host being to access the storage array via the in-band path for in-band management of the storage array, the host being to access the storage array via the out-of-band path for out-of-band management of the storage array, the microcontroller being capable of operating when the host operating system is unavailable and also when the host is powered-off, the in-band path and the out-of-band path being mutually distinct from each other.

12. The method of claim 11, wherein the unique storage identifier is a Small Computer Systems Interface (SCSI) identifier.

13. The method of claim 11, wherein the unique storage identifier is 64 bits.

14. The method of claim 11, wherein the storage request is a Small Computer Systems Interface (SCSI) command from one of a plurality of SCSI command sets.

15. The method of claim 14, wherein the management request is encoded using Extensible Markup Language (XML).

16. The method of claim 15, wherein the management request is stored in the payload of the SCSI command.

17. The method of claim 11, wherein the method is a Storage Management Initiative-Specification (SMI-S) method.

18. The method of claim 11, wherein the instance identifier is a Common Information Model (CIM) instance identifier.

19. An article including a non-transitory machine-usable medium having associated information, wherein the information, when accessed, results in a machine performing:
- receiving a management request, the management request including an instance identifier associated with a storage element and a method;
- translating the instance identifier to a unique storage identifier associated with a storage element;
- replacing the instance identifier with the unique storage identifier in the management request; and
- encapsulating the management request in a storage request to be forwarded to a storage array;
- the translating being carried out by a management provider, the management provider being included both in a host operating system and in a microcontroller, the instance identifier being translated by the management provider both if the management request is for in-band management of the storage array and also if the management request is for out-of-band management of the storage array, the in-band management being provided via an in-band path that includes the host operating system, a host bus adapter, and a storage area network, the out-of-band management being provided via an out-of-band path that includes the microcontroller, a network interface controller, and a local area network, the management provider, the host bus adapter, the network interface controller, and the microcontroller being in a host, the host being to access the storage array via the in-band path for in-band management of the storage array, the host being to access the storage array via the out-of-band path for out-of-band management of the storage array, the microcontroller being capable of operating when the host operating system is unavailable and also when the host is powered-off, the in-band path and the out-of-band path being mutually distinct from each other.

20. The article of claim 19, wherein the unique storage identifier is a Small Computer Systems Interface (SCSI) identifier.

21. The article of claim 19, wherein the method is a Storage Management Initiative-Specification (SMI-S) method.

22. A system comprising:
- a hard disk drive having a fibre channel interface;
- a translator capable of translating an instance identifier associated with the hard disk drive to a unique storage identifier associated with the hard disk drive; and
- a storage domain controller capable of encapsulating a management request in a storage request, the management request including the instance identifier and a method, the storage domain controller replacing the instance identifier with the unique storage identifier in the management request prior to forwarding the storage request to a storage array;
- the translator being comprised in a management provider, the management provider being included both in a host operating system and in a microcontroller, the instance identifier being received by the translator both if the management request is for in-band management of the storage array and also if the management request is for out-of-band management of the storage array, the in-band management being provided via an in-band path that includes the host operating system, a host bus adapter, and a storage area network, the out-of-band management being provided via an out-of-band path that includes the microcontroller, a network interface controller, and a local area network, the management provider, the host bus adapter, the network interface controller, and the microcontroller being in a host, the host being to access the storage array via the in-band path for in-band management of the storage array, the host being to access the storage array via the out-of-band path for out-of-band management of the storage array, the microcontroller being capable of operating when the host operating system is unavailable and also when the host is powered-off, the in-band path and the out-of-band path being mutually distinct from each other.

23. The system of claim 22, wherein the unique storage identifier is a Small Computer Systems Interface (SCSI) identifier.

24. The system of claim 22, wherein the method is a Storage Management Initiative-Specification (SMI-S) method.

* * * * *